Patented Oct. 25, 1949

2,485,636

UNITED STATES PATENT OFFICE 2,485,636

NUT MEATS

Ralph H. Neal, North Bergen, and Hans W. Vahlteich, Edgewater, N. J., and Chester M. Gooding, Staten Island, N. Y., assignors to The Best Foods, Inc., New York, N. Y., a corporation of New Jersey No Drawing. Application October 15, 1947, Serial No. 780,100

12 Claims. (Cl. 99—150)

This invention relates to nut meats and more particularly to improved compositions containing nut meats which are stable and which possess marked resistance to deterioration.

An object of this invention is to increase the stability of roasted edible nut meats or compositions such as pastes or butters comprising comminuted nut meats.

Another object of this invention is to retard the deterioration of compositions, such as confections and baked goods, containing nut meats.

Another object of this invention is to prevent substantially the separation of oil from compositions containing finely divided roasted nut meats and the oil derived therefrom, and expressed in the production of such compositions.

Another object of this invention is to increase the stability of peanut butter and prevent the separation of peanut butter into its oil and nut components.

One of the difficulties encountered in the production and marketing of comminuted nut meat products such as peanut butter is the separation of oil, particularly if the comminuted nut meat product is subjected to relatively high temperatures. In the production of peanut butter, for example, the free oil resulting from the grinding of peanuts in the production of the peanut butter, and contained therein, separates if permitted to stand at room temperatures for a few weeks. This separation of the finely divided solid peanut particles from the oil continues for a period of about one year. (Georgia Experiment Station Bulletin 243, October 1945.) Since peanut butter might well remain for a prolonged period on a retailer's shelf, this characteristic is a definite detriment in the merchandising of such compositions. Heretofore, various methods have been proposed for preventing the separation of oil in peanut butter. One method is storage at temperatures of 50° F. or lower until the peanut butter is delivered to the ultimate consumer. This procedure, however, involves considerable expense and care by the producer, wholesaler and retailer.. Another method which has been suggested is the addition of hydrogenated oil to the peanut butter, but the hydrogenated oil tends to dilute the peanut flavor. Other methods involve the addition of materials to absorb the oil, such as sucrose, dextrose, dried milk, raisins and oat flour (ibid.). However, these materials dilute the peanut flavor, and in addition, add other pronounced flavors.

In accordance with this invention, edible nut meats or compositions containing edible nut meats, such as peanut butter, are produced which manifest a marked degree of stability. Comminuted roasted nut meat products, such as pastes and butters, produced in accordance with this invention are substantially less likely to separate into their oil and nut components than nut meat products heretofore available. The nut meats and nut meat products, such as peanut butter, are produced by incorporating in the nut meat or nut meat product a dialkyl or dialkylene ester of citric acid in which the alkyl or alkylene group has at least 8 carbon atoms. While the concentration of the dialkyl or dialkylene ester of citric acid in the nut meat or nut meat product may vary over wide limits, a concentration of .5 to 5%, and preferably from 2 to 3%, by weight of the diester of citric acid of the nut meat is satisfactory. Desirably, the dialkyl ester of citric acid has at least 12 carbon atoms in the alkyl group, and the dialkylene ester of citiric acid has at least 16 carbon atoms in the alkylene group. While the dialkyl ester of citric acid and the dialkylene ester of citiric acid improved to a limited degree the retardation of rancidity of the nut meat or nut meat product, the nut meat or nut meat product may be markedly improved from a rancidity standpoint by the addition thereto of a monoalkyl or monoalkylene ester of citric acid. The monoalkyl or monoalkylene ester of citric acid which may be also included in the nut meat or nut meat product may have any number of carbon atoms in the alkyl or alkylene group, although advantageously it contains the same number of carbon atoms as the dialkyl or dialkylene ester, which is included in the nut meat or nut meat product. By employing both the dialkyl or dialkylene ester of citric acid and the monoalkyl or monoalkylene ester of citric acid, the nut meat or nut meat product is relatively stable and in addition manifests a marked resistance to rancidity. The amount of monoalkyl or monoalkylene ester of citric acid found satisfactory for this purpose is .002 to 1%, and preferably .025 to .1%, by weight of the monoester of the nut meat. Conveniently, the monoester and diester of citric acid may be prepared simultaneously by reacting the required amount of citric acid with an alkyl or alkylene alcohol to produce the desired amount of monoester together with the desired amount of the corresponding diester of citric acid.

The esters of citric acid may be incorporated in the whole nut meat or in a part thereof by any convenient means, such as by roasting the nut meat in an oil containing the esters, or the esters may be incorporated in a finely divided mixture of the particles derived from the whole or degerminated nut meat. If it is desired to incorporate the esters of citric acid in the whole nut meat, such as shelled peanuts, the nut meats are introduced into a heated body of oil containing the esters. Or again, nut meats, such as peanuts, may be first roasted in air, peeled and degerminated, subsequently ground into a finely divided state and the esters added to the ground mass. The whole peanuts, for example, roasted in the oil containing the esters of citric acid or the peanut butter in which the esters of citric acid are dispersed, manifest a marked resistance to deterioration due to rancidity, and in the case of peanut butter, no discernible separation of oil and finely divided nut particles is observed after subjection to storage at room temperature for many months.

The monoalkyl or monoalkylene ester of citric acid which may be incorporated in the nut meats, such as peanut butter, may have any number of carbon atoms in the alkyl or alkylene group, although conveniently it contains the same number of carbon atoms as the dialkyl or dialkylene ester which is included in the composition. For example, the monoalkyl or monoalkylene ester may have at least 12 carbon atoms in the alkyl group or at least 16 carbon atoms in the alkylene group. By employing both the dialkyl or dialkylene esters of citric acid and the monoalkyl or monoalkylene esters of citric acid, the resulting nut meat product possesses marked resistance to deterioration, and in addition particularly with nut paste, such as peanut butter, the separation of oil from the comminuted component is substantially prevented.

To produce the mono- and corresponding diesters of citric acid simultaneously, the required amount of anhydrous citric acid or citric acid monohydrate is reacted with an alkyl or alkylene alcohol or mixtures thereof to produce the desired amount of the diester together with the required amount of the corresponding monoester of citric acid.

The dialkyl or dialkylene esters of citric acid, desirably with monoalkyl or monoalkylene esters of citric acid, may be a single specie or a plurality of species. For example, it is advantageous in some cases to incorporate in the nut meat, a mixture of distearyl and dipalmityl citrates together with monostearyl and monopalmityl citrates while in other cases, the addition of a mixture of distearyl citrate and monostearyl citrate is desirable. Or again, a mixture of monoisopropyl citrate and distearyl citrate may be used. If a mixed alcohol is employed for the preparation of the citric acid esters, the resulting mixture contains some mixed esters of citric acid. For example, if a mixture of palmityl and stearyl alcohols is reacted with citric acid in the required proportions to produce the desired quantities of di- and mono-esters, the resulting product comprises in addition to dipalmityl citrate, distearyl citrate, monopalmityl citrate and monostearyl citrate, some mixed diesters of citric acid and palmityl and stearyl alcohols.

Since both the dialkyl or dialkylene citrates and the monoalkyl or monoalkylene citrates are desirably incorporated in the nut meat, it is advantageous to prepare a mixture of the mono- and di-esters of citric acid simultaneously. The mixture of mono- and di-esters of citric acid may be prepared by the esterification of citric acid and an alcohol, such as a monohydric primary or secondary unsubstituted alcohol, preferably by reacting the citric acid and the alcohol in proportions which favor the formation of the di- and mono-esters in the ratio desired in the mixture. The esterification may be conducted by any of the well known methods employed for the production of esters, and the resulting reaction mixture which may comprise not only the mono- and di-esters of citric acid, but a quantity of the triesters of citric acid, is subjected to treatment by fractional crystallization or selective extraction with a suitable solvent, if desired, which removes the major portion of the triesters of citric acid present. If desired, the mixture comprising principally the diester with a lesser amount of the mono- and some of the tri-ester, may be used in the nut meat. To produce the mixture, suitable quantities of a monohydric primary or secondary alkyl or alkylene unsubstituted alcohol, for example, may be reacted with citric acid monohydrate, by heating to an elevated temperature, such as 150° C., under reduced pressure until the reaction is completed. The reaction product without furthter purification may be incorporated in the nut meat, such as peanut butter.

Examples of the mono- and di- citric acid esters which may be incorporated in the nut meats are the citric acid esters of the following alcohols: 2 ethyl-hexanol, octanols, decanols, dodecanols, hexadecanols, octadecanols, cosanols, decosanols, 2-ethyl hexenols, octenols, decenols, dodecenols, hexadecenols, octadecenols, cosenols and docosenols.

Some of the mono-alkyl or -alkylene esters of citric acid, such as monoisopropyl citrate, are soluble only to a limited degree in glyceridic oils or mixtures containing glyceridic oils. This is particularly true of the monoalkyl esters of the citric acid in which the alkyl group has less than 10 carbon atoms. While the oil may be heated to dissolve some of these monoalkyl or monoalkylene esters, such heating, particularly if a high temperature is required, materially damages the oil. To facilitate the uniform dispersion of the monoesters throughout the body of the oil containing for example the nut meat, a solubilizing agent may be employed. The monoester is dissolved in the solubilizing agent and the resulting solution mixed, desirably with agitation, throughout the body of the oil and nut meat. Among the solubilizing agents that are satisfactory for this purpose are monoglycerides of fatty acids in which the fatty acids have at least 10 carbon atoms, unsubstituted aliphatic monohydric alcohols having at least 6 carbon atoms, fatty acids having at least 10 carbon atoms, dialkyl or dialkylene esters of citric acid, such as diesters in which the alkyl or alkylene group has at least 8 carbon atoms and trialkyl or trialkylene esters of citric acid such as trialkyl citrates or trialkylene citrates in which the alkyl or alkylene group has at least 8 carbon atoms.

Examples of monoglycerides of fatty acids which may be employed as solubilizing agents are the monstearyl glycerides, monooleyl glycerides, monolauryl glycerides, monopalmityl glycerides and monomyristyl glycerides or mixtures thereof. These monoglycerides as commercially prepared contain substantial amounts of the corresponding diglycerides and traces of the corresponding triglycerides; such monoglycerides as commercially prepared may be employed as the solubilizing agents in the compositions of this invention. These monoglycerides when incorporated in nut products prevent the separation of oil, and a composition containing both a monoalkyl or monoalkylene ester of citric acid and monoglycerides manifests marked resistance to rancidity and oil separation. One to five percent by weight of monoglycerides on the total weight of the nut product is satisfactory for this purpose.

Examples of aliphatic monohydric alcohols which may be employed as solubilizing agents are n-hexyl alcohol, 2-ethyl hexyl alcohol, stearyl alcohol, octyl alcohols and myristyl alcohol.

Examples of the fatty acids which may be employed as solubilizing agents are stearic acid, palmitic acid, oleic acid, lauric acid and myristic acid.

A more comprehensive understanding of the invention is obtained by reference to the following examples.

*Example 1.—Peanut butter containing monostearyl citrate and distearyl citrate*

Peanut butter is prepared in the conventional manner by any of the well known methods by crushing the nut kernels to the desired size. A portion of the nut kernels is further compressed to release a substantial portion of the oil therein, and this portion is decanted to separate the oil component from the meal component. A sufficient quantity of a mixture of monostearyl citrate, distearyl citrate and tristearyl citrate is added to the oil so that the peanut butter to which the oil is added will contain about 2% by weight of the mixture of monostearyl citrate, distearyl citrate and tristearyl citrate. The mixture of monostearyl citrate, distearyl citrate and tristearyl citrate contains about 50% of distearyl citrate, about 15 to 20% of the monostearyl citrate and the remainder tristearyl citrate. The resulting peanut butter after standing a period of 7 weeks at 95° F. does not manifest any discernible rancidity, and the oil and meal component shows no significant separation.

The mixture of monostearyl citrate, distearyl citrate and tristearyl citrate employed in this example was prepared as follows:

12.1 kilos of citric acid monohydrate are added to 30 kilos of commercial stearyl alcohol (containing some palmityl alcohol) which is previously melted. During the addition, the mixture is agitated. The mixture is held at 150° C. under reduced pressure for a period of 1½ hours. At the end of this period, boiling and foaming ceases substantially. The resulting product which consists of a mixture of about 10 to 15% monostearyl citrate, about 50% distearyl citrate and the remainder tristearyl citrate together with a quantity of mono-, di- and tri-palmityl citrates has an acid value of about 83, a saponification value of about 249 and a melting point of about 51 to 68° C. and a color on the Lovibond scale of about 35Y–5.8R.

*Example 2.—Peanut butter containing substantially pure distearyl citrate*

Peanuts are first chopped coarsely in a suitable machine such as a food chopper. A portion of the meal is separated from the oil and is further pressed to obtain the major portion of the oil contained therein. Sufficient pure distearyl citrate is added to this oil to obtain in the final product to which the oil is added 2% by weight of distearyl citrate, based on the total product. This resulting solution of distearyl citrate in the oil is added to the main body of chopped peanuts and oil. About 1% of salt is added to the mixture. The mixture is again ground in a comminuting machine, such as a food chopper, to obtain a relatively fine grainy mass. If desired to obtain a very fine grind, a stone mill may be employed, and the preparation passed through the stone mill or other suitable comminuting apparatus one or more times. If desired, the peanut oil to which the substantially pure distearyl citrate is added may be hydrogenated and deodorized and, in that case, the hydrogenated oil containing the substantially pure distearyl citrate is added to the mass of peanut butter.

The substantially pure distearyl citrate employed in this example is produced by initially preparing a mixture of monostearyl citrate, distearyl citrate and tristearyl citrate as described in Example 1, and the distearyl citrate is separated from the resulting reaction mixture by fractional crystallization from a suitable solvent, such as ethanol or isopropanol, the tristearyl citrate coming out of solution before the distearyl citrate. The monostearyl citrate is retained in solution.

The pure distearyl citrate had an acid value of 76.4 and a saponification value of 240.2 (calculated acid value 80.6 and saponification value 242). Distearyl citrate, upon super cooling, exhibits a double melting point; one at 53° C. and a second melting point at 70 to 72° C.

A sample of peanut butter containing the substantially pure stearyl citrate prepared in accordance with the example was compared with samples of peanut butter produced in the identical manner and under identical conditions except that in one sample there was no additive (i. e. a control) and to the other 2% of tristearyl citrate was added instead of 2% of distearyl citrate. All samples were filled into 8 ounce jars and stored at 95° F. for seven weeks. At the end of that time the samples were examined for oil separation, mouthing characteristics and flavor. The result of that testing appears in the following table:

| Composition | Observations after 7 weeks at 95° F. |
|---|---|
| Peanut Butter without any additive (Control). | 3–4 mm. of free oil was discernible on surface; very sticky in mouth; flavor OK. |
| Peanut Butter containing 2% of pure distearyl citrate. | No free oil in pockets or on surface; much less sticky in mouth; flavor OK. |
| Peanut Butter containing 2% of pure tristearyl citrate. | Approximately 1 mm. free oil on surface; sticky in mouth; flavor OK. |

It is observed that the peanut butter containing the distearyl citrate did not manifest any oil separation and had improved mouthing characteristics.

*Example 3.—Roasted peanuts having incorporated therein monoisopropyl citrate and diisopropyl citrate*

Peanuts are shelled, and the skins removed and degerminated. The resulting peanuts are immersed in a suitable frying oil such as cottonseed oil containing .05% by weight of a mixture of monoisopropyl citrate and diisopropyl citrate. The amount of monoisopropyl citrate in the mixture is about 90% and the amount of diisopropyl citrate is about 10%. After the peanuts are suitably roasted in the oil, they are withdrawn, and the oil permitted to drain. The resulting roasted peanuts manifest a marked resistance to rancidity.

The mixture of monoisopropyl citrate and diisopropyl citrate employed in this example is prepared as follows:

Equal parts of USP citric acid and anhydrous isopropyl alcohol are heated together under reflux, without catalyst for 118 hours at 92° C., after which time the acid value of the reaction mixture is found to be about 203.6 and the saponification value 392 (one-half esterified). The alcohol and most of the water of reaction are removed by low temperature evaporation in vacuo.

The residue is taken up with ethyl ether and then thrown out of the ether solution by the addition of a quantity of low-boiling petroleum ether just sufficient to form a precipitate. The pricipitate or oily residue is again taken up with ethyl ether and the precipitation with low boiling petroleum ether repeated. This procedure is repeated several times. After final removal of solvent by heating with stirring to 130° C., a typical analysis is:

|  | Found | Calc'd |
| --- | --- | --- |
| Acid Value | 454 | 480 |
| Saponification Value | 709 | 720 |

This product solidifies after long standing and consists of a mixture of about 90% monoester and 10% diester.

*Example 4.—Peanut butter containing monoisopropyl citrate and monoglycerides*

Peanut butter is prepared in the conventional manner, and to the finished peanut butter is added a solution of monoisopropyl citrate in monostearin. The monoisopropyl citrate may be prepared by the method described in Example 3. The solution of the monoisopropyl citrate in the monostearin is prepared from the mixture of about 90% monoisopropyl citrate and about 10% diisopropyl citrate, as described in Example 3, to effect a concentration of .025% of monoisopropyl citrate and 3% of monostearin in the finished peanut butter. If desired, the monostearin may be advantageously prepared from a completely hydrogenated peanut oil.

The monoesters of citric acid and likewise, the diesters of citric acid may be incorporated in the peanut butter by any other suitable means, such as roasting the peanuts in an oil containing the mono- and di-esters and then crushing the peanuts to form the peanut butter.

*Example 5.—Peanut butter containing monostearyl citrate, distearyl citrate, monooleyl citrate and dioleyl citrate*

Peanut butter containing 3% of a mixture of monostearyl citrate, distearyl citrate, monooleyl citrate and dioleyl citrate is prepared in the same manner as the peanut butter described in Example 2, except that 3% of a mixture of monostearyl citrate, distearyl citrate, monooleyl citrate and dioleyl citrate is incorporated in the peanut butter instead of 2% of monostearyl citrate.

The mixture of citric acid esters employed in the production of peanut butter of this example is prepared as follows:

A mixture of 14 kilos of commercial oleyl alcohol and 14 kilos of commercial stearyl alcohol are melted. To this mixture is added 10.2 kilos of anhydrous citric acid. During the addition, the mixture is agitated. The mixture is heated and held for a period of 1¼ hours at 150° C. under reduced pressure. At the end of this period, boiling and foaming ceases substantially. The mixture contains the distearyl citrate, dioleyl citrate and their corresponding mono- and triesters together with mixed esters containing both stearyl and oleyl groups.

While in the specific examples peanut butter compositions were described, other nut meats may be utilized, and such other nut products, such as almond and cashew nut butter compositions, are similarly improved by the incorporation therein of the mono- and di-esters of citric acid as heretofore described.

The terms and expressions which we have employed are used as terms of description and not of limitation, and we have no intention, in the use of such terms and expressions, of excluding any equivalents of the features described or portions thereof, but recognize that various modifications are possible within the scope of the invention claimed.

What is claimed is:

1. An edible nut meat having incorporated therein a member selected from the class consisting of monoalkyl esters of citric acid, monoalkylene esters of citric acid, dialkyl esters of citric acid and dialkylene esters of citric acid, said alkyl and said alkylene groups in said diesters having at least 8 carbon atoms.

2. A peanut butter having incorporated therein a member selected from the class consisting of monoalkyl esters of citric acid, monoalkylene esters of citric acid, dialkyl esters of citric acid and dialkylene esters of citric acid, said alkyl and said alkylene groups in said diesters having at least 8 carbon atoms.

3. A peanut butter having incorporated therein .5 to 5% by weight of a dialkyl ester of citric acid in which the alkyl group has at least 8 carbon atoms.

4. A peanut butter having incorporated therein .5 to 5% by weight of a dialkylene ester of citric acid in which the alkylene group has at least 8 carbon atoms.

5. A peanut butter having incorporated therein .5 to 5% by weight of a dialkyl ester of citric acid and .002 to 1% by weight of a monoalkyl ester of citric acid, the alkyl group in said diester having at least 8 carbon atoms.

6. A peanut butter having incorporated therein .5 to 5% by weight of a dialkylene ester of citric acid in which the alkylene group has at least 8 carbon atoms, and .002 to 1% by weight of a monoalkylene ester of citric acid.

7. A peanut butter having incorporated therein 2 to 3% by weight of a dialkyl ester of citric acid in which the alkyl group has at least 12 carbon atoms and .025 to .1% by weight of a monoalkyl ester of citric acid.

8. A peanut butter having incorporated therein 2 to 3% by weight of a dialkylene ester of citric acid in which the alkylene group has at least 16 carbon atoms and .025 to .1% by weight of a monoalkylene ester of citric acid.

9. The method of producing an edible nut meat which comprises incorporating therein a member selected from the class consisting of monoalkyl esters of citric acid, monoalkylene esters of citric acid, dialkyl esters of citric acid and dialkylene esters of citric acid, said alkyl and said alkylene groups in said diesters having at least 8 carbon atoms.

10. The method of producing an improved nut meat which comprises roasting the nut meat in an oil having incorporated therein a member selected from the class consisting of monoalkyl esters of citric acid, monoalkylene esters of citric acid, dialkyl esters of citric acid and dialkylene esters of citric acid, said alkyl and said alkylene groups in said diesters having at least 8 carbon atoms.

11. The method of producing an improved peanut butter which comprises incorporating in a finely divided mixture of oil and particles derived from peanuts, a member selected from the class consisting of monoalkyl esters of citric acid, monoalkylene esters of citric acid, dialkyl esters of citric acid and dialkylene esters of citric acid, said alkyl and said alkylene groups in said diesters having at least 8 carbon atoms.

12. Peanut butter having incorporated therein .5 to 5% by weight of distearyl citrate and .002 to 1% by weight of monostearyl citrate.

RALPH H. NEAL.
HANS W. VAHLTEICH.
CHESTER M. GOODING.

REFERENCES CITED

The following references are of record in the file of this patent:

UNITED STATES PATENTS

| Number | Name | Date |
| --- | --- | --- |
| 1,857,274 | Emhardt | May 10, 1932 |
| 2,122,716 | Graves | July 5, 1938 |
| 2,197,269 | Guillaudeu | Apr. 16, 1940 |